(12) United States Patent
Robinson et al.

(10) Patent No.: US 12,271,043 B2
(45) Date of Patent: Apr. 8, 2025

(54) OPTICAL FIBER PITCH ADJUSTMENT

(71) Applicant: Life Technologies Corporation, Carlsbad, CA (US)

(72) Inventors: Derek Robinson, Marcola, OR (US); Wesley Smith, Elmira, OR (US); Keith Kearsley, Eugene, OR (US)

(73) Assignee: Life Technologies Corporation, Carlsbad, CA (US)

( * ) Notice: Subject to any disclaimer, the term of this patent is extended or adjusted under 35 U.S.C. 154(b) by 371 days.

(21) Appl. No.: 17/729,480

(22) Filed: Apr. 26, 2022

(65) Prior Publication Data

US 2022/0350093 A1 Nov. 3, 2022

Related U.S. Application Data

(60) Provisional application No. 63/180,157, filed on Apr. 27, 2021.

(51) Int. Cl.
*G02B 6/42* (2006.01)
*G01N 15/1434* (2024.01)

(52) U.S. Cl.
CPC ....... *G02B 6/4226* (2013.01); *G01N 15/1434* (2013.01); *G01N 2015/1452* (2013.01)

(58) Field of Classification Search
CPC .... G02B 6/42; G02B 6/4226; G01N 15/1434; G01N 2015/1452
See application file for complete search history.

(56) References Cited

U.S. PATENT DOCUMENTS 5,080,459 A * 1/1992 Wettengel ............ G02B 6/4452
385/95

\* cited by examiner

*Primary Examiner* — Michael P Mooney

(57) ABSTRACT

Provided are optical fiber alignment assemblies, comprising: a plurality of fiber channel members being arranged along a first vertical axis, each fiber channel member comprising a fiber channel configured to accommodate an optical fiber disposed therein, the plurality of fiber channels being parallel to one another, fiber channels adjacent to one another defining a spacing therebetween, the spacing being measured along the first vertical axis; a plurality of resilient members, a resilient member being disposed between adjacent fiber channel members; and an adjustment element, the adjustment element being configured to effect a force oriented along the first vertical axis, and the adjustment member being configured such that actuation of the adjustment member changes a compression of the plurality of resilient members so as to effect an essentially linear variation in the spacing between adjacent fiber channels. Also provided are related methods.

20 Claims, 5 Drawing Sheets

OPTICAL FIBER PITCH ADJUSTMENT

CROSS-REFERENCE TO RELATED APPLICATIONS

This application claims priority to and the benefit of U.S. Provisional Application No. 63/180,157, "Optical Fiber Pitch Adjustment" (filed Apr. 27, 2021), the entirety of which is incorporated by reference herein for any and all purposes.

TECHNICAL FIELD

The present disclosure relates to assemblies having adjustable optical fiber spacing.

BACKGROUND

In many flow cytometers, a series of lasers are positioned vertically in space so that a particle can be fluidically delivered through each laser sequentially, resulting in fluorescence associated with each laser. The fluorescent light given off during this interrogation process can be magnified and focused with a lens onto the ends of specialized fiber optics.

In such an arrangement, a vertical pattern of fiber optics is positioned according to the combined variance of the collection lens magnification and vertical beam position so that fluorescent light from a laser-illuminated particle is focused on the end of each fiber optic simultaneously. Accordingly, there is a long-felt need in the art for articles and methods that can precisely and predictably set the spacing of a vertical pattern of fiber optic fibers.

SUMMARY

In meeting the described long-felt needs, the present disclosure provides an alignment flexure, comprising: a plurality of leaves, the plurality of leaves arranged along a first vertical axis extending through each of the plurality of leaves; each leaf comprising a central portion, the central portion comprising a fiber channel for accommodating an optical fiber inserted therein, the fiber channels of the leaves being essentially perpendicular to the first vertical axis, and the fiber channels of the leaves being essentially parallel to one another; and a leaf adjustment element engaged with the plurality of leaves, the leaf adjustment element being configured to exert a force essentially parallel to the first vertical axis, application of the force effecting an essentially linear variation in a spacing between the fiber channels of the leaves.

Also provided are methods, comprising: with an alignment flexure according to present disclosure (e.g., according to any one of Aspects 1 to 22), actuating the leaf adjustment element so as adjust a spacing between the fiber channels of the leaves.

Further disclosed are flow cytometers, comprising: a flow channel configured to contain a flow having a plurality of particles disposed therein; an alignment flexure according to the present disclosure (e.g., according to any one of Aspects 1 to 22); the alignment flexure positioned so as to place the fiber optic channels of the leaves into register with the flow channel; and at least one fiber optic disposed within a fiber optic channel of a leaf of the alignment flexure, the at least one fiber optic being configured to illuminate a particle disposed within the flow channel, to collect fluorescence evolved from a particle disposed within the flow channel, or both.

Also disclosed are methods, comprising: with a flow cytometer according to the present disclosure (e.g., according to Aspect 24), communicating a particle through the flow channel; and illuminating the particle with illumination from the at least one fiber optic and/or collecting a fluorescence from the particle with the at least one fiber optic.

Further disclosed are optical fiber alignment assemblies, comprising: a plurality of fiber channel members being arranged along a first vertical axis, each fiber channel member comprising a fiber channel configured to accommodate an optical fiber disposed therein, the plurality of fiber channels being parallel to one another, fiber channels adjacent to one another defining a spacing therebetween, the spacing being measured along the first vertical axis; a plurality of resilient members, a resilient member being disposed between adjacent fiber channel members; and an adjustment element, the adjustment element being configured to effect a force oriented along the first vertical axis, and the adjustment member being configured such that actuation of the adjustment member changes a compression of the plurality of resilient members so as to effect an essentially linear variation in the spacing between adjacent fiber channels.

Also provided are methods, comprising: with an assembly that comprises: a plurality of fiber channel members, each fiber channel member comprising a fiber channel configured to accommodate an optical fiber disposed therein, the plurality of fiber channels being arranged along a first vertical axis, the plurality of fiber channels being parallel to one another, and fiber channels adjacent to one another defining a spacing therebetween, the spacing being measured along the first vertical axis; a plurality of resilient members, a resilient member being disposed between adjacent fiber channel members; and an adjustment element configured to effect a force oriented along the first vertical axis, actuating the adjustment element so as to change a compression of the plurality of resilient members that effects an essentially linear variation in the spacing between adjacent fiber channels.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document. In the drawings.

DETAILED DESCRIPTION OF ILLUSTRATIVE EMBODIMENTS

Figure 1:
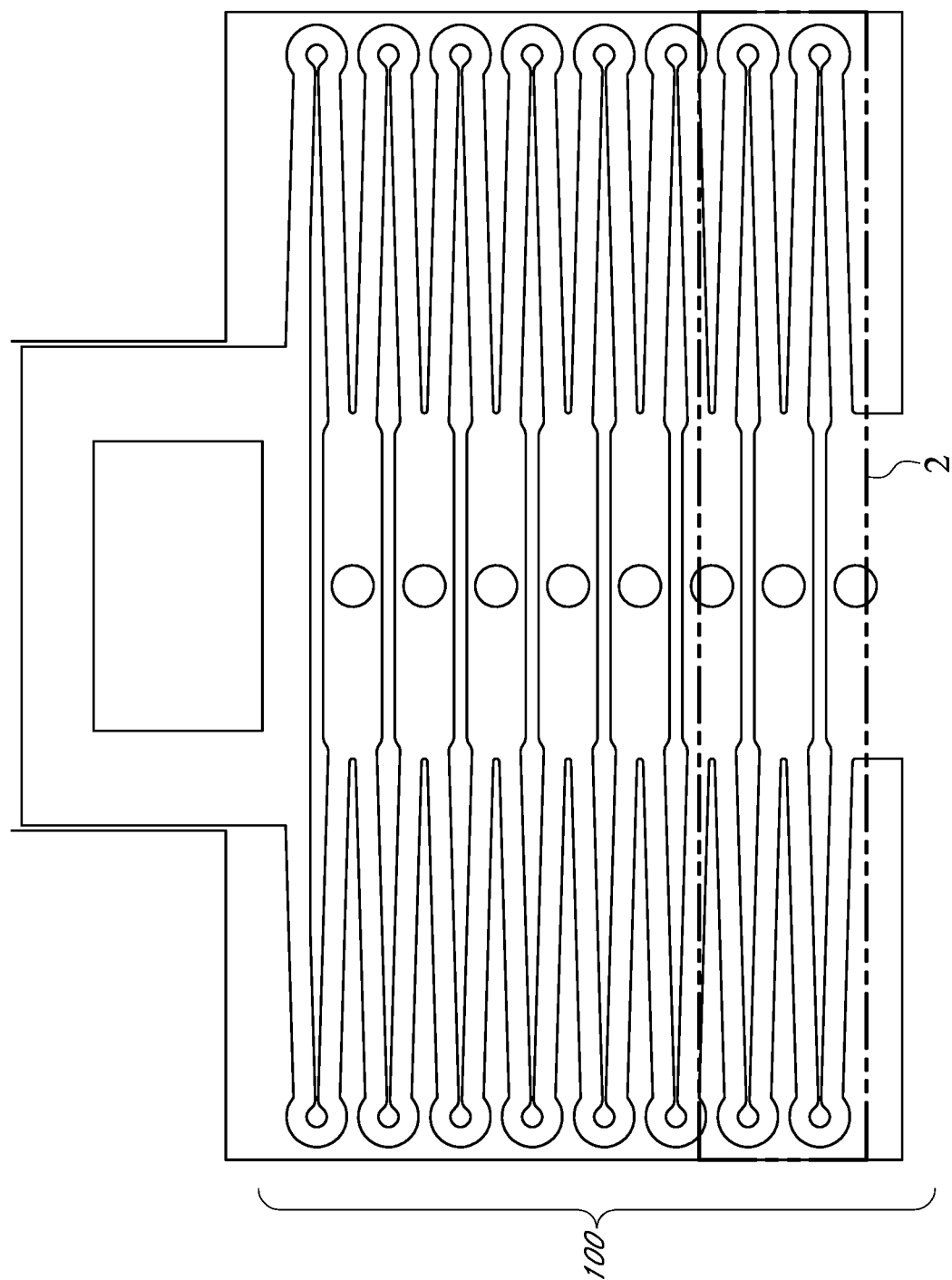
FIG. 1 provides a view of an exemplary assembly (flexure) according to the present disclosure.

The present disclosure may be understood more readily by reference to the following detailed description of desired embodiments and the examples included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of" The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4. Further, the term "comprising" should be understood as having its open-ended meaning of "including," but the term also includes the closed meaning of the term "consisting." For example, a composition that comprises components A and B may be a composition that includes A, B, and other components, but may also be a composition made of A and B only. Any documents cited herein are incorporated by reference in their entireties for any and all purposes.

As such, there is a need for a micro-precision adjustment mechanism that can reliably set the spacing of a vertical pattern of (up to) 8 Fiber Optic cables. In our system, the fiber optics are to be adjusted so that the spacing between each of the 8 fibers can be varied between 1.3-1.7 mm (to account for the collection lens magnification variance). The fiber optic diameters are 0.800 mm—leaving very little room for mechanical solutions. Furthermore, the array of fiber optics must be position-able to within 0.040 mm of the desired spacing with all fiber centers located within 0.040 mm of a derived vertical axis located on a vertical plane.

FIGURES

The attached figures are illustrative only and do not limit the scope of the present disclosure or the appended claims.

FIG. 1 provides a view of a flexure 100 according to the present disclosure.

Figure 2:
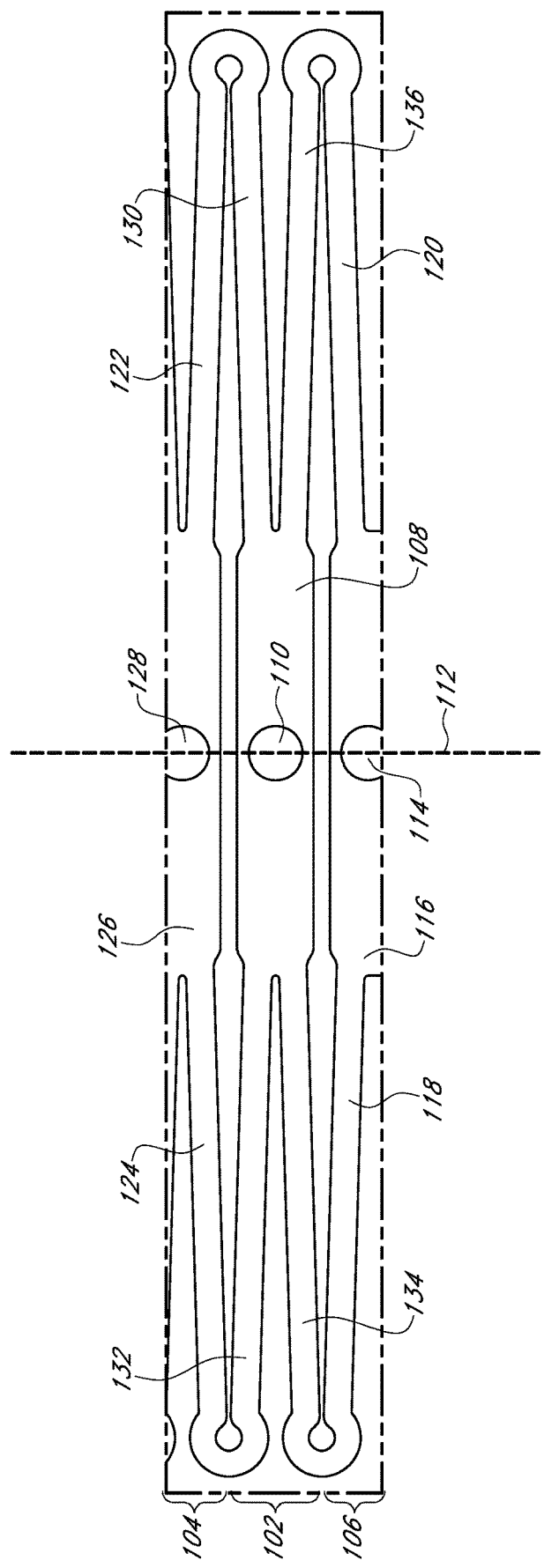
FIG. 2 provides a magnified view of the exemplary assembly shown in FIG. 1.

FIG. 2 provides a magnified view of flexure 100 shown in FIG. 1. As shown, a flexure can include first leaf 102, second leaf 104, and third leaf 106. First leaf 102 can include a central portion 108, which central portion 108 can include fiber optic channel 110 in said central portion. Second leaf 104 can include central portion 126, with fiber optic channel 128 present in said central portion. Third leaf 106 can include central portion 116, with fiber optic channel 114 disposed in said central portion. As shown, fiber optic channels 128, 110, and 114 can be parallel to one another, and can also be aligned along first vertical axis 112. In some embodiments, the centers of fiber optic channels 128, 110, and 114 lie along first vertical axis 112 or at least lie within a certain tolerance distance measured perpendicular to said first vertical axis 112.

As shown, first leaf 102 can include first upper flange 132 and second upper flange 130. First upper flange 132 of first leaf 102 can connect to first lower flange 124 of second leaf 104. Similarly, second upper flange 130 of first leaf 102 can connect to second lower flange 122 of second leaf 104. In this way, first leaf 102 and second leaf 104 can be connected to one another.

First leaf 102 can also include first lower flange 134 and second lower flange 136. The first lower flange 134 can connect to the first upper flange 118 of third leaf 106. Similarly, the second lower flange 136 can connect to the second upper flange 120 of third leaf 106.

In the exemplary arrangement shown in FIG. 1, the leaves are arranged in an accordion-style arrangement. In some embodiments, the flexure is a unibody piece that is formed of a single piece of material, e.g., by casting or even by 3D printing.

Figure 3:
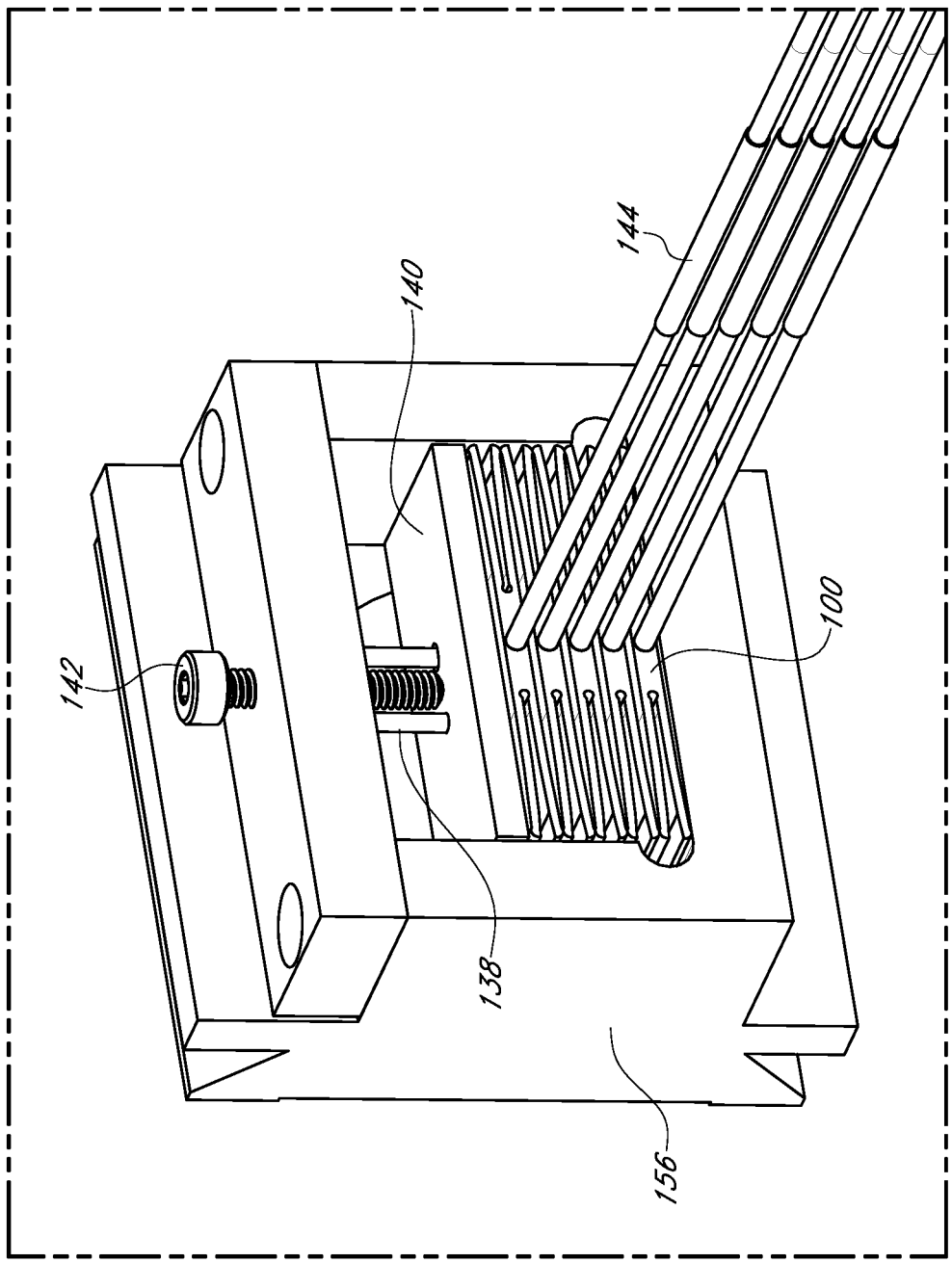
FIG. 3 provides a back view of an exemplary assembly according to the present disclosure.

FIG. 3 provides a back view of an exemplary flexure 100 installed into a cabinet. As shown, flexure 100 has been installed into cabinet 156, with fiber optics 144 installed into the fiber optic channels of flexure 100. As shown, a leaf adjustment element (which, in FIG. 3, includes a screw) is configured such that actuation of the element effects movement of push block 140 in a direction perpendicular to the fiber optics. Guide rods 138 extend through push block 140 and can operate so that push block 140 slides up and down the guide rods in response to actuation of adjustment element 142.

By turning the screw of adjustment element 142, a user can effect downward movement of push block 142, which movement in turn acts to compress the leaves in flexure 100, which compression results in reduced distance (or pitch) between adjacent fiber optics. Without being bound to any particular theory or embodiment, the push block can act to transfer the force of the adjustment screw onto the outer edges of the topmost leaf to effect equal (or near-equal) loading, and thus, equal (or near-equal) spacing between all the fibers.

Because flexure 100 is configured inherently as a spring, compression of the flexure in turn results in a linear change in the spacing between adjacent leaves and also the spacing between adjacent fiber optic channels and adjacent fiber optics. Without being bound to any particular theory, the linear variation in a spring's compression can be described by Hooke's law, F=kx, where F=applied force, k=the spring's constant, and x=the spring's compression/displacement.

Figure 4:
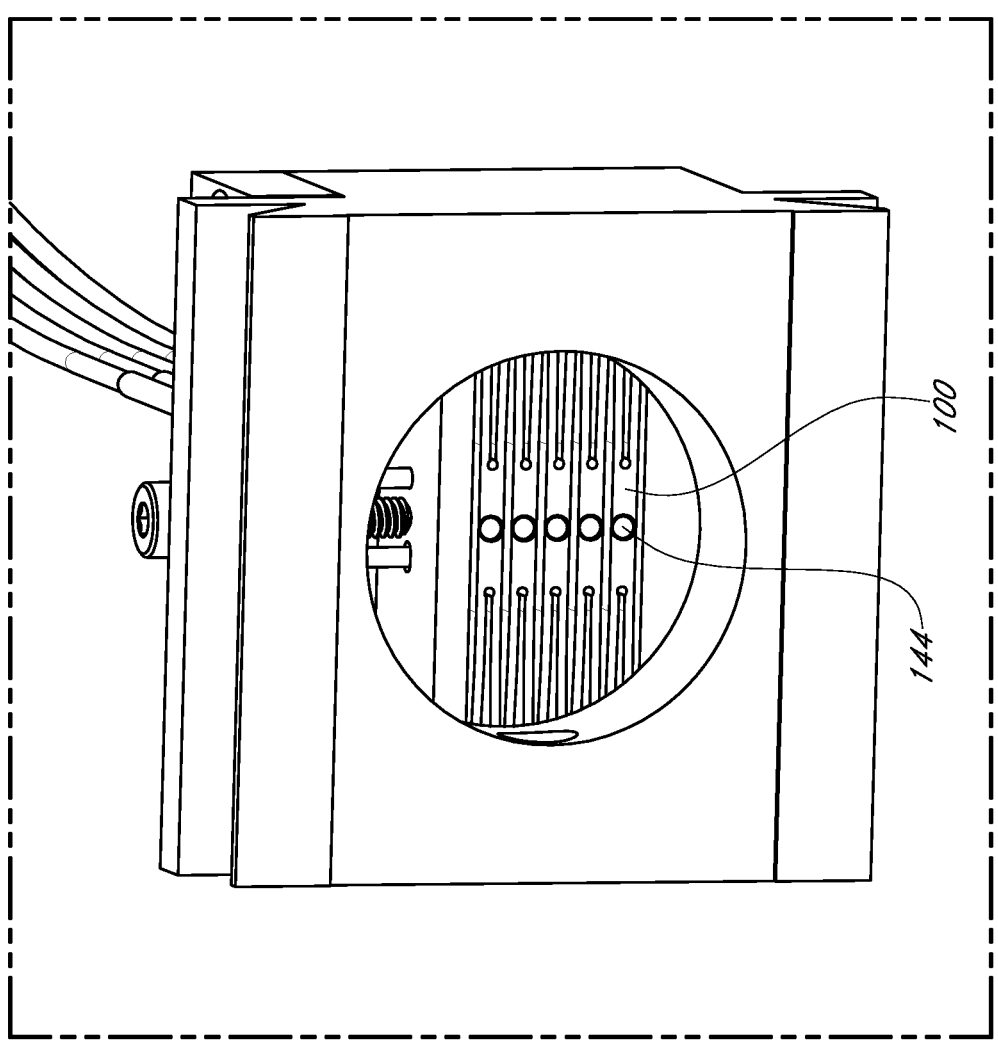
FIG. 4 provides a front view of an exemplary assembly according to the present disclosure.

FIG. 4 provides a front view of the assembly shown in FIG. 3. As shown in FIG. 4, the ends of the fiber optics 144 are seen as fed into the fiber optic channels of flexure 100.

As shown, an alignment component (e.g., a flexure or other assembly) according o the present disclosure can include, inter alia, a push block to distribute the pushing force into the first (or uppermost) leaf in the same manner as the force is transferred to the subsequent leaves. Also as shown, a leaf can include a central hole that holds the fiber optic in place. The disclosed articles can also include a flexible feature or part that deflects elastically throughout the adjustment range; such features can be, e.g., springs, elastomers, and the like. An article can also include one or more guide rods to promote linear movement of the leaves (or fiber optic members) as they are compressed together or allowed to space apart from one another.

By reference to the non-limiting leaf/flexure design illustrated herein, the geometry and material properties can be selected to allow for a range of adjustment without plastic deformation of the leaves. The force required to compress the leaves (i.e., to bring adjacent leaves closer to one another) is suitably such that it overcomes the effects of friction on the guide rods and the weight of the optical fibers, so as to ensure consistent movement. Similarly, the geometry and material properties of the leaves (and their associated flanges, by reference to FIG. 2) can be selected such that the spring constant is as uniform as possible for the entire array. Such selection can ensure consistent deflection from leaf to leaf, resulting in even spacing between each fiber. In one non-limiting design, the flexure is configured such that a force of 30 N completely collapses each leaf, with a high-yield stainless steel (17-4 PH SS per ASTM A693) used to maximize the load bearing capacity of the leaf flexures. Leaves can be manufactured using an EDM process, and a flexure can be designed just beyond its fully extended state to ensure all positions in the working range are under a compressive force, which acts to hold the position of the fibers. Leaves can comprise a coating (e.g., black oxide per MIL-DTL-13294) to ensure UV stability.

One can size and locate the fiber channel in a leaf to minimize the positional variance of the fiber optic core within the leaf. As one example, a 0.800 mm glass fiber was fitted with a stainless steel tube, inserted into the leaf flexure, and epoxied in place. The stainless steel tube serves as strain relief for the brittle glass fibers. Accordingly, it should be understood that the disclosed articles can include a sleeve or other liner (such as a coating) disposed within at least a portion of a fiber optic channel so as to be positioned between the fiber optic and the leaf or fiber optic member in which the fiber optic channel is disposed.

Figure 5:
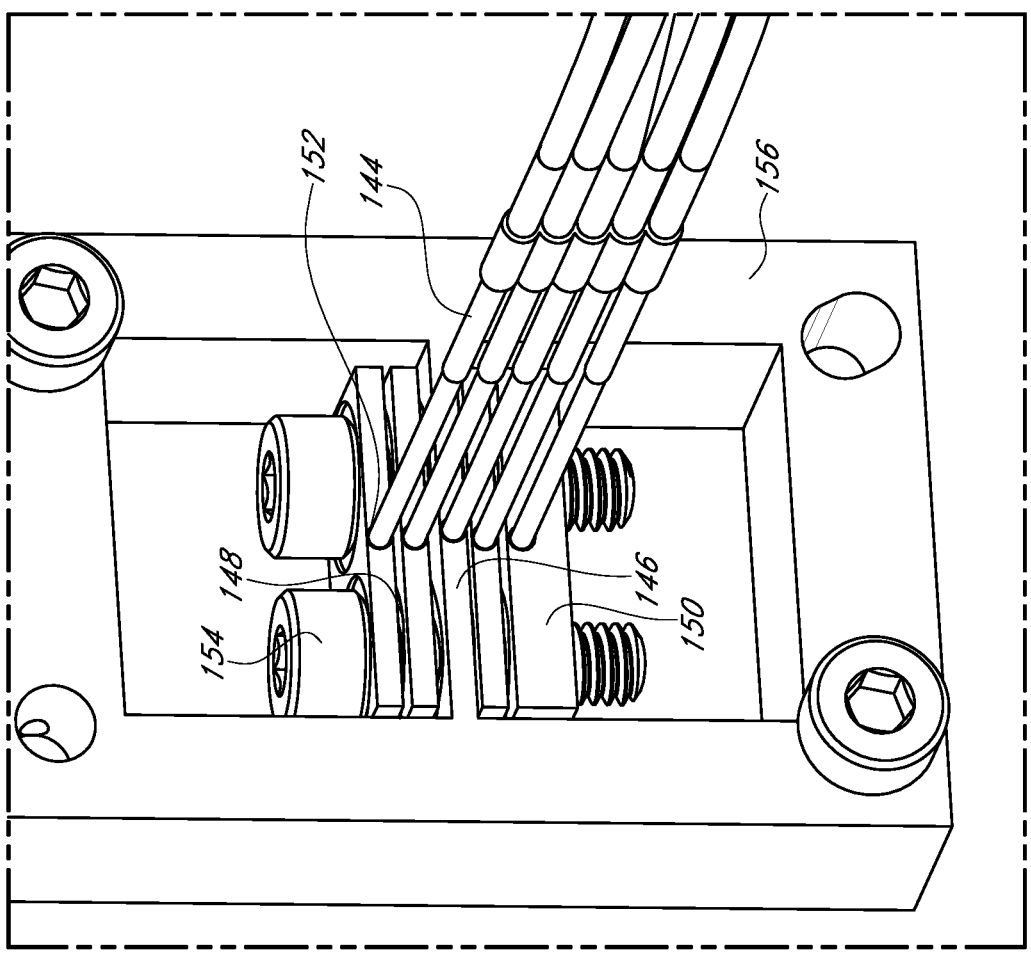
FIG. 5 provides a back view of an exemplary assembly according to the present disclosure.

FIG. 5 depicts an alternative embodiment of an assembly according to the present disclosure. As shown, a plurality of fiber optic members are installed within frame 156, with each fiber optic member having a fiber optic channel 152 configured to accommodate at least one of optical fibers 144 disposed therein. Resilient member(s) 148 (e.g., a spring, an elastomer) can be placed between adjacent fiber optic members.

An adjustment element 154 can be configured to exert a downward force on the fiber optic members and resilient members. As shown in FIG. 5, the adjustment element can be a screw, which screw can engage with a threaded block 150. The screw head can contact the uppermost of the fiber optic members; alternatively, a washer, block, or other intermediate element can be positioned between the screw head and the uppermost of the fiber optic members. As shown, an assembly can include a fixed block 146, which fixed block can be mounted to or even be part of frame 156. Fixed block 146 can include one or more fiber channels therein, and one or more resilient members can be disposed between fixed block 140 and adjacent fiber optic members.

Actuating adjustment element 154 (e.g., by turning the screw) changes a compression of the plurality of resilient members so as to effect an essentially linear variation in the spacing between adjacent fiber channels, including fiber channels disposed within a fixed block, if a fixed block is present. As an illustrative, non-limiting example, the spacing between adjacent fiber channels can be 0.1 mm, which spacing can be adjusted to, e.g., 0.08 mm via actuating the adjustment element.

ASPECTS

The following Aspects are illustrative only and do not limit the scope of the present disclosure or the appended claims.

Aspect 1. An alignment flexure, comprising: a plurality of leaves, the plurality of leaves arranged along a first vertical axis extending through each of the plurality of leaves; each leaf comprising a central portion, the central portion comprising a fiber channel for accommodating an optical fiber inserted therein, the fiber channels of the leaves being essentially perpendicular to the first vertical axis, and the fiber channels of the leaves being essentially parallel to one another; and a leaf adjustment element engaged with the plurality of leaves, the leaf adjustment element being configured to exert a force essentially parallel to the first vertical axis, application of the force effecting an essentially linear variation in a spacing between the fiber channels of the leaves.

Aspect 2. The alignment flexure of Aspect 1, further comprising a push block, the push block being arranged so as to transmit the force from the leaf adjustment element to an uppermost of the plurality of leaves. The push block can be configured to move in a direction essentially parallel to the first vertical axis.

Aspect 3. The alignment flexure of any one of Aspects 1 to 2, further comprising a guide rod, the guide rod being inserted within two or more guide rod channels formed in the plurality of leaves, the two or more guide rod channels being in register with one another and being aligned essentially parallel to the first vertical axis.

Aspect 4. The alignment flexure of any one of Aspects 1 to 3, wherein the leaf adjustment element comprises a screw and a first resilient member.

Aspect 5. The alignment flexure of Aspect 4, wherein the first resilient member comprises a spring.

Aspect 6. The alignment flexure of Aspect 4, wherein the first resilient member comprises an elastomer.

Aspect 7. The alignment flexure of any one of Aspects 4 to 6, wherein the leaf adjustment element comprises a screw oriented along the first vertical axis, further comprising at least one intermediate resilient member disposed between adjacent leaves, wherein at least one of the plurality of leaves is a fixed leaf, the screw extending through the fixed leaf and the screw configured such that rotation of the screw effects a change in a compression of the at least one intermediate resilient member so as to change a spacing between the adjacent leaves between which the least one intermediate resilient member is disposed.

Aspect 8. The alignment flexure of Aspect 7, further comprising a threaded block configured for engagement with the screw.

Aspect 9. The alignment flexure of Aspect 8, wherein the threaded block comprises a central portion, the central portion comprising a fiber channel for accommodating an optical fiber inserted therein.

Aspect 10. The alignment flexure of any one of Aspects 7 to 9, further comprising at least one intermediate resilient member disposed between the fixed leaf and a first leaf adjacent to the fixed leaf, further comprising at least one intermediate resilient member disposed between the first leaf and a second leaf adjacent to the first leaf, and wherein rotation of the screw effects an essentially linear variation in a spacing between the fiber channels of the fixed leaf, the first leaf, and the second leaf.

Aspect 11. The alignment flexure of any one of Aspects 7 to 10, wherein the intermediate resilient member comprises a spring or an elastomer. Springs are considered particularly suitable.

Aspect 12. The alignment flexure of any one of Aspects 1 to 6, wherein each leaf comprises (a1) a first upper flange portion extending from the central portion of the leaf in a direction essentially perpendicular to the fiber channel of the leaf, (a2) a first lower flange portion extending from the central portion of the leaf in a direction essentially perpendicular to the fiber channel of the leaf, (b1) a second upper flange portion extending from the central portion of the leaf in a direction essentially perpendicular to the fiber channel of the leaf and away from the first upper flange portion, and (b2) a second lower flange portion extending from the central portion of the leaf in a direction essentially perpendicular to the fiber channel of the leaf and away from the first lower flange portion.

Aspect 13. The alignment flexure of Aspect 12, wherein the first upper flange portion of a first leaf connects to the first lower flange portion of a second leaf that is disposed adjacent to and above the first leaf, wherein the second upper flange portion of the first leaf connects to the second lower flange portion of the second leaf, wherein the first lower flange portion of the first leaf connects to the first upper flange portion of a third leaf that is disposed adjacent to and below the first leaf, and wherein the second lower flange portion of the first leaf connects to the second upper flange portion of the third leaf.

Aspect 14. The alignment flexure of Aspect 12, wherein the first leaf, the second leaf, and the third leaf are integral with one another. As an example, the first leaf, the second leaf, and the third leaf are formed in a single body, e.g., a monolithic body. Such a single body can be formed via 3D printing, electrical discharge machining (EDM), or other methods. Alternatively, the leaves (and their flanges) can be connected to one another via welding, brazing, gluing, and the like. Flanges can be joined so as to form a living hinge, in some embodiments.

Aspect 15. The alignment flexure of Aspect 12, wherein the plurality of leaves is characterized as a spring, the spring exerting a force generally in the direction of the first vertical axis. As an example, the flanges of adjacent leaves can connect to one another.

Aspect 16. The alignment flexure of any one of Aspects 1 to 15, further comprising a scissor mechanism configured to, in the direction of the first vertical axis, adjustably separate the central portions of the plurality of leaves from one another.

Aspect 17. The alignment flexure of Aspect 4, further comprising a second resilient member, the second resilient member configured to exert a force upwards in the direction of the first vertical axis, the force generally acting to separate the central portions of the plurality of leaves from one another.

Aspect 18. The alignment flexure of any one of Aspects 1 to 17, wherein a spacing between the centers of the fiber channels of the plurality of leaves is from about 1 mm to about 2 mm, measured along the first vertical axis.

Aspect 19. The alignment flexure of Aspect 18, wherein the spacing between the centers of the fiber channels of the plurality of leaves is from about 1.3 mm to about 1.7 mm (e.g., about 1.5 mm), measured along the first vertical axis.

Aspect 20. The alignment flexure of any one of Aspects 1 to 19, wherein the centers of the fiber channels all lie within about 0.05 mm or less of a vertical line parallel to the first vertical axis, as measured perpendicular to the vertical line.

Aspect 21. The alignment flexure of Aspect 20, wherein the centers of the fiber channels all lie within about 0.04 mm or less of the vertical line. The centers of the fiber channels can also lie within about 0.02 mm of the vertical line, or even less than 0.02 mm from the vertical line.

Aspect 22. The alignment flexure of any one of Aspects 1 to 21, further comprising a fiber optic disposed within a fiber optic channel of a leaf.

Aspect 23. A method, comprising: with an alignment flexure according to any one of Aspects 1 to 22, actuating the leaf adjustment element so as adjust a spacing between the fiber channels of the leaves.

Aspect 24. A flow cytometer, comprising: a flow channel configured to contain a flow having a plurality of particles disposed therein; an alignment flexure according to any one of Aspects 1 to 22; the alignment flexure positioned so as to place the fiber optic channels of the leaves into register with the flow channel; and at least one fiber optic disposed within a fiber optic channel of a leaf of the alignment flexure, the at least one fiber optic being configured to illuminate a particle disposed within the flow channel, to collect fluorescence evolved from a particle disposed within the flow channel, or both.

Aspect 25. A method, comprising: with a flow cytometer according to Aspect 24, communicating a particle through the flow channel; and illuminating the particle with illumination from the at least one fiber optic and/or collecting a fluorescence from the particle with the at least one fiber optic.

Aspect 26. An optical fiber alignment assembly, comprising: a plurality of fiber channel members being arranged along a first vertical axis, each fiber channel member comprising a fiber channel configured to accommodate an optical fiber disposed therein, the plurality of fiber channels being parallel to one another, fiber channels adjacent to one another defining a spacing therebetween, the spacing being measured along the first vertical axis; a plurality of resilient members, a resilient member being disposed between adjacent fiber channel members; and an adjustment element, the adjustment element being configured to effect a force oriented along the first vertical axis, and the adjustment member being configured such that actuation of the adjustment member changes a compression of the plurality of resilient members so as to effect an essentially linear variation in the spacing between adjacent fiber channels.

Aspect 27. The optical fiber alignment assembly of Aspect 26, wherein the adjustment member comprises a screw.

Aspect 28. A method, comprising actuating the adjustment element of an optical fiber alignment assembly according to any one of Aspects 26 to 27 so as to effect the essentially linear variation in the spacing between adjacent fiber channels.

Aspect 29. A method, comprising: with an assembly that comprises: a plurality of fiber channel members, each fiber channel member comprising a fiber channel configured to accommodate an optical fiber disposed therein, the plurality of fiber channels being arranged along a first vertical axis, the plurality of fiber channels being parallel to one another, and fiber channels adjacent to one another defining a spacing therebetween, the spacing being measured along the first vertical axis; a plurality of resilient members, a resilient member being disposed between adjacent fiber channel members; and an adjustment element configured to effect a force oriented along the first vertical axis, actuating the adjustment element so as to change a compression of the plurality of resilient members that effects an essentially linear variation in the spacing between adjacent fiber channels.

Aspect 30. The method of Aspect 29, wherein the adjustment element comprises a screw.

What is claimed:

1. An alignment flexure, comprising:
a plurality of leaves,
the plurality of leaves arranged along a first vertical axis extending through each of the plurality of leaves;
each leaf comprising a central portion, the central portion comprising a fiber channel for accommodating an optical fiber inserted therein,
the fiber channels of the leaves being essentially perpendicular to the first vertical axis, and
the fiber channels of the leaves being essentially parallel to one another; and
a leaf adjustment element engaged with the plurality of leaves,
the leaf adjustment element being configured to exert a force essentially parallel to the first vertical axis, application of the force effecting an essentially linear variation in a spacing between the fiber channels of the leaves.

2. The alignment flexure of claim 1, further comprising a push block, the push block being arranged so as to transmit the force from the leaf adjustment element to an uppermost of the plurality of leaves.

3. The alignment flexure of claim 1, further comprising a guide rod, the guide rod being inserted within two or more guide rod channels formed in the plurality of leaves, the two or more guide rod channels being in register with one another and being aligned essentially parallel to the first vertical axis.

4. The alignment flexure of claim 1, wherein the leaf adjustment element comprises a screw and a first resilient member.

5. The alignment flexure of claim 4,
wherein the leaf adjustment element comprises a screw oriented along the first vertical axis,
further comprising at least one intermediate resilient member disposed between adjacent leaves,
wherein at least one of the plurality of leaves is a fixed leaf,
the screw extending through the fixed leaf and the screw configured such that rotation of the screw effects a change in a compression of the at least one intermediate resilient member so as to change a spacing between the adjacent leaves between which the least one intermediate resilient member is disposed.

6. The alignment flexure of claim 5, further comprising a threaded block configured for engagement with the screw, the threaded block optionally comprising a central portion, the central portion comprising a fiber channel for accommodating an optical fiber inserted therein.

7. The alignment flexure of claim 5,
further comprising at least one intermediate resilient member disposed between the fixed leaf and a first leaf adjacent to the fixed leaf,
further comprising at least one intermediate resilient member disposed between the first leaf and a second leaf adjacent to the first leaf, and
wherein rotation of the screw effects an essentially linear variation in a spacing between the fiber channels of the fixed leaf, the first leaf, and the second leaf.

8. The alignment flexure of claim 1, wherein each leaf comprises (a1) a first upper flange portion extending from the central portion of the leaf in a direction essentially perpendicular to the fiber channel of the leaf, (a2) a first lower flange portion extending from the central portion of the leaf in a direction essentially perpendicular to the fiber channel of the leaf, (b1) a second upper flange portion extending from the central portion of the leaf in a direction essentially perpendicular to the fiber channel of the leaf and away from the first upper flange portion, and (b2) a second lower flange portion extending from the central portion of the leaf in a direction essentially perpendicular to the fiber channel of the leaf and away from the first lower flange portion.

9. The alignment flexure of claim 8, wherein the first upper flange portion of a first leaf connects to the first lower flange portion of a second leaf that is disposed adjacent to and above the first leaf, wherein the second upper flange portion of the first leaf connects to the second lower flange portion of the second leaf, wherein the first lower flange portion of the first leaf connects to the first upper flange portion of a third leaf that is disposed adjacent to and below the first leaf, and wherein the second lower flange portion of the first leaf connects to the second upper flange portion of the third leaf.

10. The alignment flexure of claim 8, wherein the plurality of leaves is characterized as a spring, the spring exerting a force generally in the direction of the first vertical axis.

11. The alignment flexure of claim 1, further comprising a scissor mechanism configured to, in the direction of the first vertical axis, adjustably separate the central portions of the plurality of leaves from one another.

12. The alignment flexure of claim 1, wherein a spacing between the centers of the fiber channels of the plurality of leaves is from about 1 mm to about 2 mm, measured along the first vertical axis.

13. The alignment flexure of claim 1, wherein the centers of the fiber channels all lie within about 0.05 mm or less of a vertical line parallel to the first vertical axis, as measured perpendicular to the vertical line.

14. A flow cytometer, comprising:
a flow channel configured to contain a flow having a plurality of particles disposed therein;
an alignment flexure according to claim 1;
the alignment flexure positioned so as to place the fiber optic channels of the leaves into register with the flow channel; and
at least one fiber optic disposed within a fiber optic channel of a leaf of the alignment flexure,
the at least one fiber optic being configured to illuminate a particle disposed within the flow channel, to collect fluorescence evolved from a particle disposed within the flow channel, or both.

15. A method, comprising:
with a flow cytometer according to claim 14,
communicating a particle through the flow channel; and
illuminating the particle with illumination from the at least one fiber optic and/or collecting a fluorescence from the particle with the at least one fiber optic.

16. An optical fiber alignment assembly, comprising:
a plurality of fiber channel members being arranged along a first vertical axis,
each fiber channel member comprising a fiber channel configured to accommodate an optical fiber disposed therein,
the plurality of fiber channels being parallel to one another,
fiber channels adjacent to one another defining a spacing therebetween,
the spacing being measured along the first vertical axis;
a plurality of resilient members, a resilient member being disposed between adjacent fiber channel members; and
an adjustment element,
the adjustment element being configured to effect a force oriented along the first vertical axis, and
the adjustment member being configured such that actuation of the adjustment member changes a compression of the plurality of resilient members so as to effect an essentially linear variation in the spacing between adjacent fiber channels.

17. The optical fiber alignment assembly of claim 16, wherein the adjustment member comprises a screw.

18. A method, comprising actuating the adjustment element of an optical fiber alignment assembly according to claim 16 so as to effect the essentially linear variation in the spacing between adjacent fiber channels.

19. A method, comprising:
with an assembly that comprises:
a plurality of fiber channel members,
each fiber channel member comprising a fiber channel configured to accommodate an optical fiber disposed therein,
the plurality of fiber channels being arranged along a first vertical axis,
the plurality of fiber channels being parallel to one another, and
fiber channels adjacent to one another defining a spacing therebetween,
the spacing being measured along the first vertical axis;
a plurality of resilient members, a resilient member being disposed between adjacent fiber channel members; and
an adjustment element configured to effect a force oriented along the first vertical axis, actuating the adjustment element so as to change a compression of the plurality of resilient members that effects an essentially linear variation in the spacing between adjacent fiber channels.

20. The method of claim 19, wherein the adjustment element comprises a screw.

* * * * *